US006658519B1

United States Patent
Broberg, III et al.

(10) Patent No.: US 6,658,519 B1
(45) Date of Patent: Dec. 2, 2003

(54) BUS BRIDGE WITH EMBEDDED INPUT/OUTPUT (I/O) AND TRANSACTION TRACING CAPABILITIES

(75) Inventors: Robert Neal Broberg, III, Rochester, MN (US); Paul B. Kubista, West Concord, MN (US); Daniel Frank Moertl, Rochester, MN (US); Daniel Paul Wetzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 09/627,503

(22) Filed: Jul. 28, 2000

(51) Int. Cl.[7] ............................................... G06F 13/36
(52) U.S. Cl. ...................... 710/311; 710/306; 710/309; 714/31; 713/200
(58) Field of Search ................................ 710/311, 306, 710/309, 100, 200, 240; 713/200; 370/519; 711/141, 144; 714/48, 31

(56) References Cited

U.S. PATENT DOCUMENTS

| 4,205,373 | A | * | 5/1980 | Shah et al. ................. 710/306 |
|---|---|---|---|---|
| 5,440,722 | A | * | 8/1995 | VanderSpek et al. ......... 714/43 |
| 5,961,625 | A | * | 10/1999 | Carter ......................... 710/311 |
| 5,987,571 | A | * | 11/1999 | Shibata et al. .............. 711/141 |
| 5,996,034 | A | * | 11/1999 | Carter ......................... 710/100 |
| 6,026,460 | A | * | 2/2000 | David et al. ................. 710/309 |
| 6,070,253 | A | * | 5/2000 | Tavallaei et al. .............. 714/31 |
| 6,138,198 | A | * | 10/2000 | Garnett et al. .............. 710/311 |
| 6,141,757 | A | * | 10/2000 | Seeker et al. ............... 713/200 |
| 6,304,983 | B1 | * | 10/2001 | Lee et al. ...................... 714/48 |
| 6,414,971 | B1 | * | 7/2002 | James et al. ................. 370/519 |

* cited by examiner

Primary Examiner—Gopal C. Ray
Assistant Examiner—Justin King
(74) Attorney, Agent, or Firm—Bracewell & Patterson LLP; Roy W. Truelson

(57) ABSTRACT

A transaction tracing circuit for use with a bus bridge that is couplable to at least a first and second bus. The transaction tracing circuit includes at least one set of trace control registers that is associated with a transaction tracing function for tracing a specific transaction occurring on the bus bridge. A number of bus transaction tracing circuits, one for each bus to which the bridge is connected, are coupled to the trace control registers and are utilized to store is transactions that are captured as they occur on the individual buses. An internal transaction tracing circuit is coupled to the trace control registers and is utilized for storing captured internal transaction information corresponding to the specific internal transaction.

30 Claims, 11 Drawing Sheets

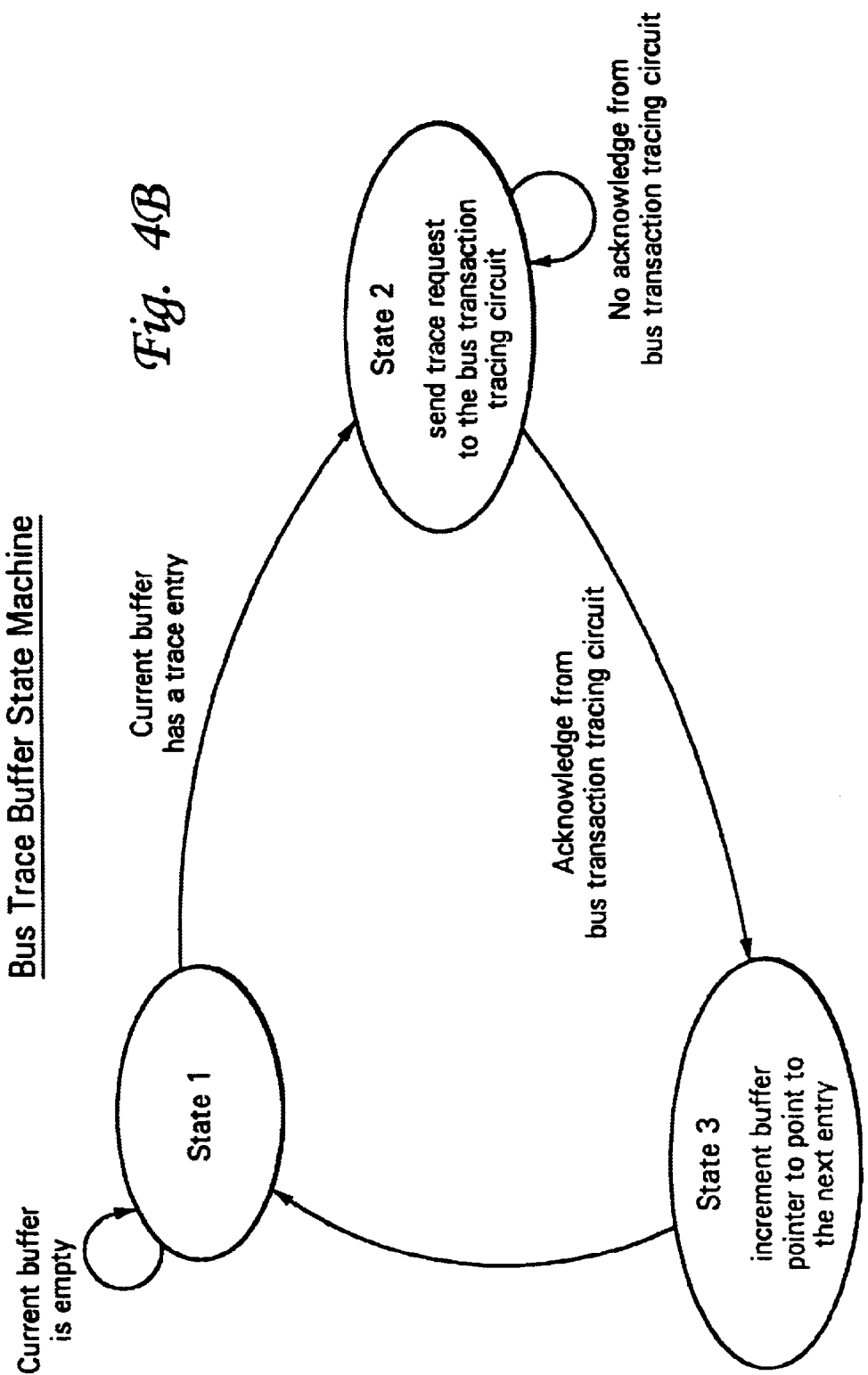

BUS BRIDGE WITH EMBEDDED INPUT/OUTPUT (I/O) AND TRANSACTION TRACING CAPABILITIES

BACKGROUND OF THE INVENTION

1. Technical Field

The present invention relates in general to Input/Output (I/O) bus architectures and, in particular, to bus bridges that provide a data interface allowing independent buses to communicate with each other. Specifically, the present invention relates to a transaction tracing circuit embedded in a bus bridge that provides transaction tracing capabilities and a method thereof.

2. Description of the Related Art

With the ever-increasing advances in technology, the number, types and functional power of computer system components has also steadily increased. In computer systems, electronic devices that comprise the computer system are interconnected with one another utilizing buses that provide the means through which the devices can communicate with each other. With the large number and different operating speeds of different components, current computer systems typically include two and possibly more buses for interconnecting the various electronic devices.

Buses are generally classified as central processing unit (CPU) system buses or input/output (I/O) buses. Host buses are typically short in length, capable of transferring data at high speeds, and are matched to a memory system to maximize memory-CPU bandwidth. A designer of a system bus is usually familiar with the types of devices that are to be connected to the host bus and is able to design an efficient system bus to accommodate the needs of the devices. I/O buses, in contrast, are often lengthy and may have a wide variety of disparate devices connected to them. I/O buses also generally have a wide range in the data bandwidth of the devices connected to them.

One device commonly utilized to couple together two different buses is referred to as a bridge chip, also known as a bus bridge. The bus bridge is an electronic device that provides a data interface between independent buses, sometimes operating at different speeds. The bus bridge allows for devices connected to the different buses to communicate with each other. Typically, requests transferred between buses via a bus bridge can be either posted or non-posted. A posted request refers to a request from a source agent on a source bus that has been accepted by the bus bridge. The source agent also knows that the request will be provided to a target agent on the target bus, regardless of whether the request has been actually delivered to the target agent or whether the request is pending in a buffer in the bus bridge. A non-posted request that is being transferred through the bus bridge and the source agent does not know whether the request can be delivered to the target agent until it has been actually received by the target agent.

Monitoring and tracing bus transaction activity, such as the above discussed requests, on a bus bridge is an important tool for determining system performance and troubleshooting the system. Transaction tracing, such as dynamic usage of instruction types and other fields, address translation and memory reference patterns, provide insight on the behavior of the particular combination of architecture, implementation, system software and application program from which the transaction trace was collected, and so can be used to guide design decisions by system developers. Generally, there are two main components to the process of generating a bus transaction trace: bus capture and trace generation. A system program establishes the state of the system under test by a combination of writing out register values or invalidating caches. This may result in a bus controller starting a transaction by placing a particular address on a bus. An external bus analyzer, such as a logic analyzer, records the bus transaction activity and from this a file of bus transactions is produced. Trace generation proceeds by driving a system simulator with the recorded bus transactions and recoding the sequence that results. A problem inherent with this approach, or in the case of troubleshooting a system problem, is that external devices, i.e., logic analyzers, must be employed to record the transaction trace. In embedded systems this can be of particular concern, since space for debug connectors is usually constrained.

Accordingly, what is needed in the art is an improved bus bridge that does not require the use of external devices to trace bus transactions occurring on the bus bridge. More particularly, what is needed in the art is a bus bridge with embedded transaction tracing capabilities.

SUMMARY OF THE INVENTION

It is therefore an object of the invention to provide an improved bus bridge with embedded transaction tracing capabilities.

It is an object of the present invention to provide a transaction tracing circuit for tracing bus transactions that occur on buses connected to the bus bridge, regardless of whether or not the bus bridge is the target of the transaction, i.e. transaction tracing as either the master, slave, or third party to a transaction.

To achieve the foregoing objects, and in accordance with the invention as embodied and broadly described herein a transaction tracing circuit for use with a bus bridge that is couplable to at least a first and a second bus is disclosed. The transaction tracing circuit includes at least one set of trace control registers that is associated with a transaction tracing function for tracing a specific transaction occurring on the bus bridge. A number of bus transaction tracing circuits, one for each bus to which the bridge is connected, are coupled to the trace control registers and are utilized to store transactions that are captured as they occur on the individual buses. An internal transaction tracing circuit is coupled to the trace control registers and is utilized for storing captured internal transaction information corresponding to the specific internal transaction. In a related embodiment, the transaction tracing circuit also includes a correlation circuit, an address control logic and a memory controller. The correlation circuit is coupled to the internal transaction tracing circuit and the bus transaction tracing circuits for correlating the incoming trace requests and prioritizing the storage of information corresponding to the captured bus transaction information. The address control logic is coupled to the trace control register and the correlation circuit for associating the captured bus transaction information that is to be stored with the proper storage control information contained in the trace control registers. The memory controller is coupled to the address control logic and the correlation circuit and performs the store operation to a specified address and routing data to a storage device. In an advantageous embodiment, the memory device is a static random access memory (SRAM) device.

In another embodiment of the present invention, the transaction tracing circuit further includes a checkpoint logic that is coupled to the trace control register for determining address matching and bus command matching when the bus transaction tracing function includes checkpoint tracing. This allows for transaction tracing that is targeted to a specific address, or set of addresses, and bus command type.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4B illustrates an exemplary diagram of a state machine for a bus trace buffer;

DETAILED DESCRIPTION OF THE PREFERRED EMBODIMENT

Figure 1:
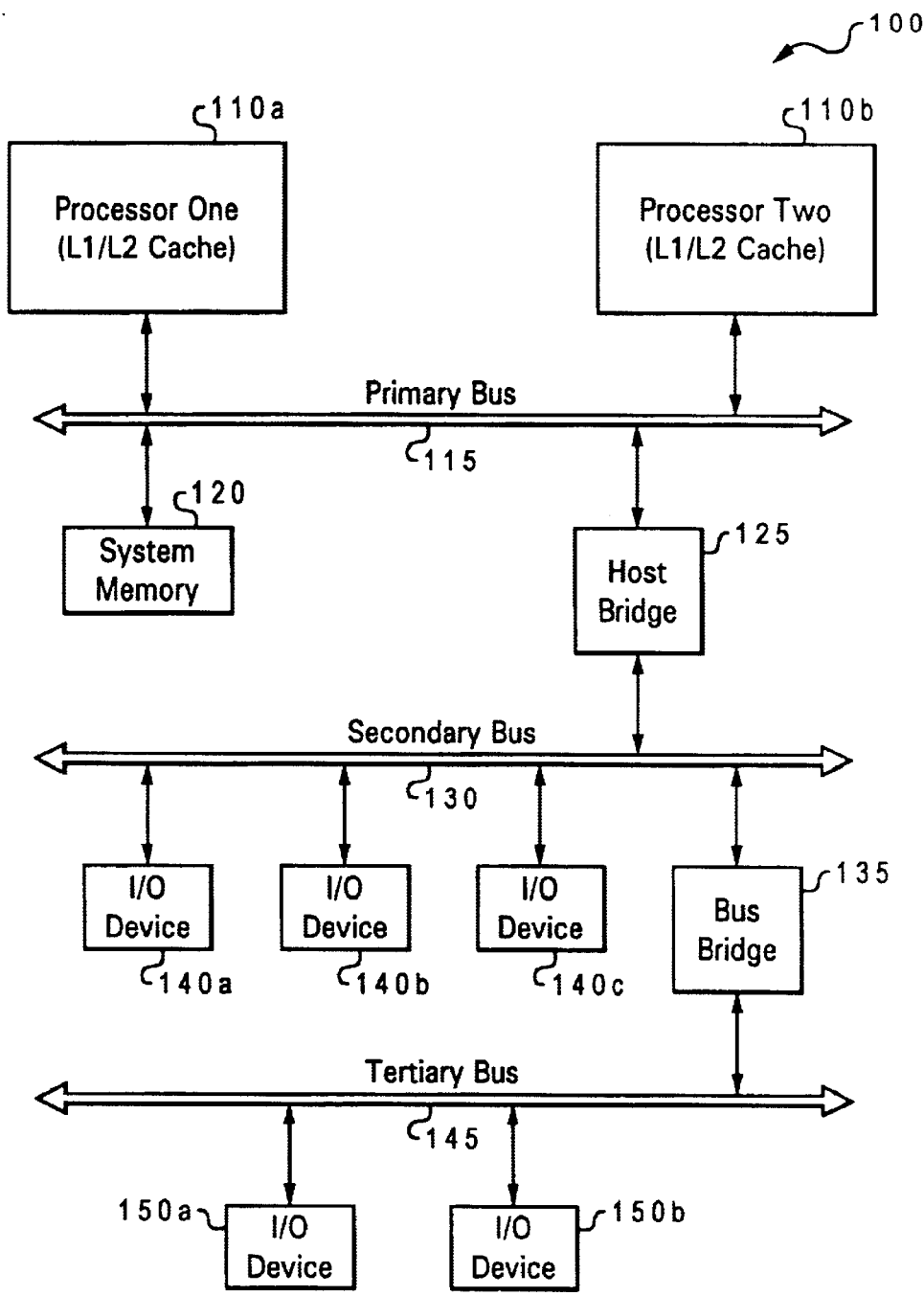
FIG. 1 illustrates an exemplary multi-processor topology that provides a suitable environment for the practice of the present invention.

With reference now to the figures and in particular with reference to FIG. 1, there is depicted an exemplary multi-processor topology 100 that provides a suitable environment for the practice of the present invention. Multi-processor topology 100 includes first and second processors 110a, 110b that are coupled to each other and a system memory 120 via a primary bus 115. A host bridge 125, essentially a bus bridge, provides a communication channel between primary bus 115 and a secondary bus 130. For example, a bus bridge may be utilized to provide a data interface between buses that are operating at different speeds, e.g., primary bus 115 may be operating at 66 MHZ while secondary bus 130 is operating at 33 MHZ, to allow any devices connected to either bus to communicate with one another. Also illustrated is a first plurality of input/output (I/O) devices, designated 140a, 140b, 140c, such as a local area network (LAN) adapter card, that are coupled to secondary bus 130. A bus bridge 135 couples secondary bus 130 to a tertiary bus 145 allowing a second plurality of I/O devices, designated 150a, 150b, to communicate with all the devices within multiprocessor topology 100.

Figure 2:
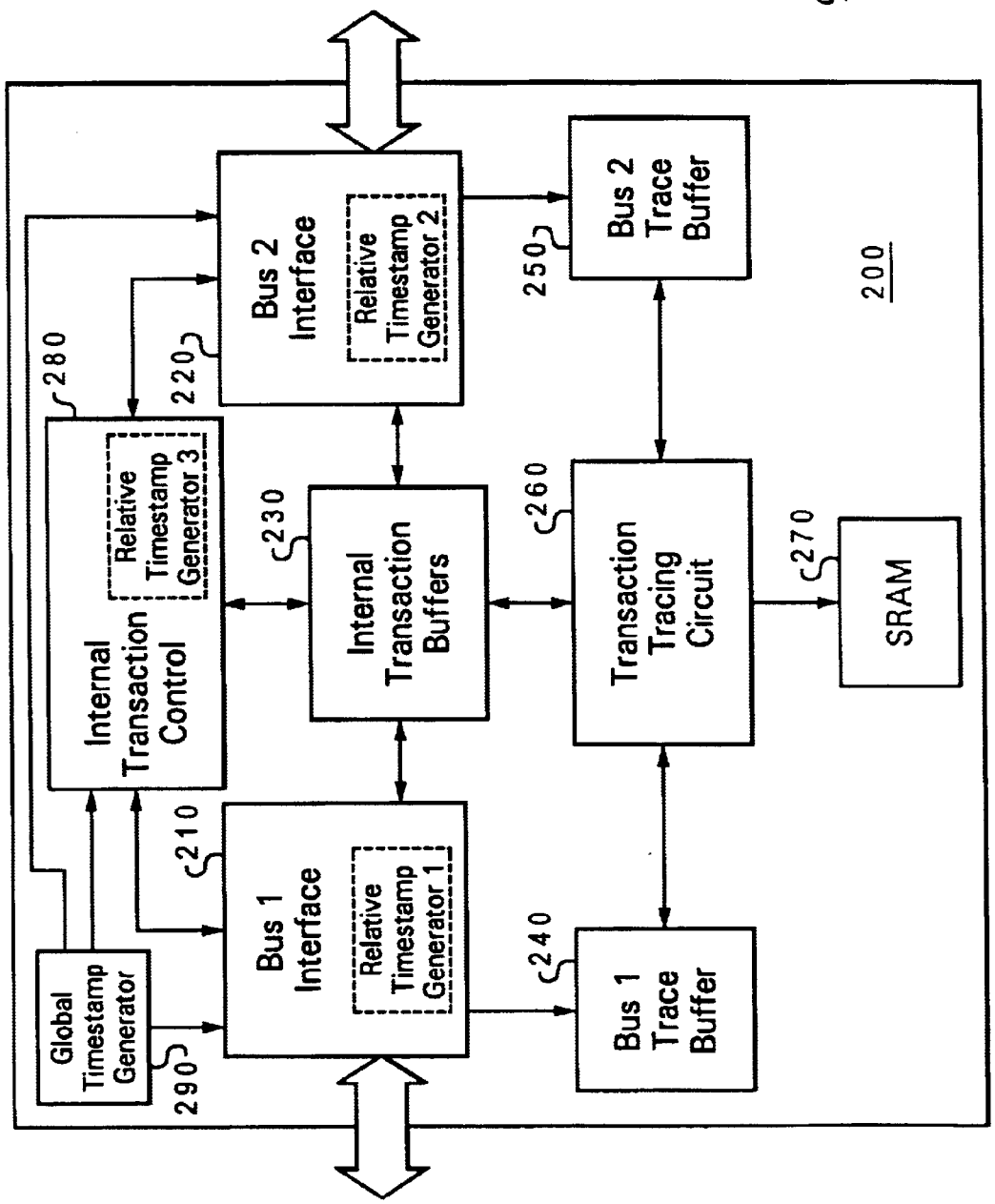
FIG. 2 illustrates a block diagram of an embodiment of a bus bridge utilizing a transaction tracing circuit of the present invention.

Referring now to FIG. 2, there is illustrated a block diagram of an embodiment of a bus bridge 200 utilizing a transaction tracing circuit 260 of the present invention. In a preferred embodiment, bus bridge 200, including transaction tracing circuit 260, is embodied in a monolithic integrated circuit (IC). Bus bridge 200 (analogous to bus bridge 135 depicted in FIG. 1) includes first and second bus interfaces 210, 220 that are coupled to first and second bus trace buffers 240, 250, respectively. First and second bus interfaces 210, 220 are utilized to provide a means for interfacing to buses that operate independently, such as secondary bus 115 and tertiary bus 130 illustrated in FIG. 1. An internal transaction control 280 is coupled to first and second bus interfaces 210, 220 and is utilized to sequence transactions that pass through bus o bridge 200 from first bus interface 210 to second bus interface 220 and vice versa. Internal transaction buffers 230 are coupled to first and second bus interfaces 210, 220 as well as internal transaction control 280 and is used to store internal control and data for all transactions as they sequence through bus bridge 200. In an advantageous implementation, internal transaction buffers 230 includes multiple, independent buffers. Bus bridge 200 also includes transaction tracing circuit 260 coupled to bus trace buffers 240, 250 as well as internal transaction buffers 230 and static random access memory (SRAM) 270. Transaction tracing circuit 260 is utilized in the present invention to track, i.e., record, transaction activity on the buses that are coupled to bus bridge 200 and transactions as they sequence through bus bridge 200. A global timestamp generator 290 included in bus bridge 200 is utilized to provide a global timestamp counter for associating timestamp information for the transaction activity.

Figure 3:
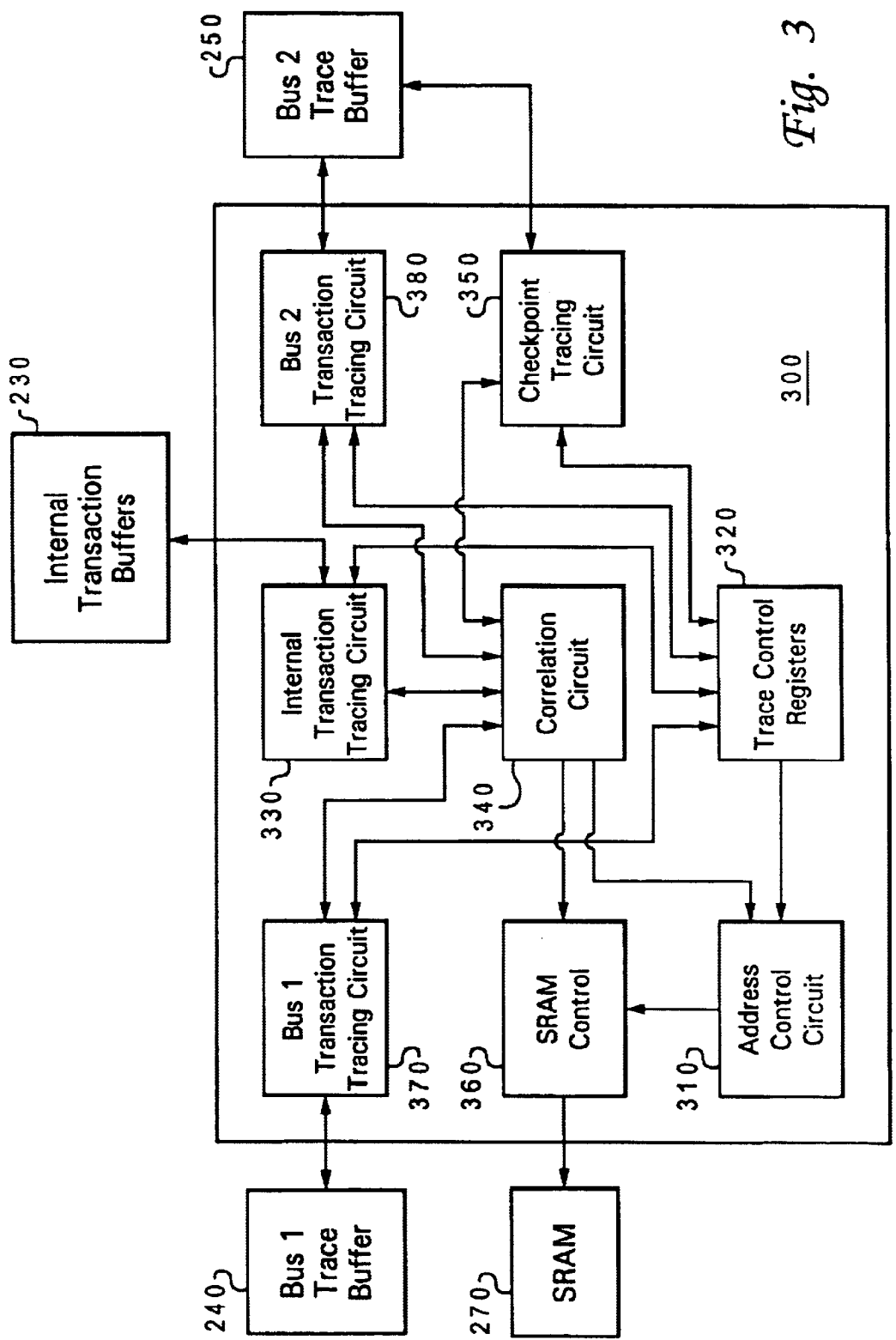
FIG. 3 illustrates an exemplary block diagram of an embodiment of a transaction tracing circuit according to the principles of the present invention.

Referring now to FIG. 3, there is depicted an exemplary block diagram of an embodiment of a transaction tracing circuit 300 according to the principles of the present invention. Transaction tracing circuit 300, analogous to transaction tracing circuit 260 illustrated in FIG. 2, includes a number of trace control registers, generally designated 320, that contains SRAM range allocation and control information for each trace function. Additionally, trace control registers 320 also contain the SRAM addresses where the next trace entry will be stored for each trace function. In an advantageous embodiment, trace control registers 320 are also utilized to contain a global timestamp counter for timestamp correlation across all trace functions, and also contains checkpoint address matching values that are utilized when checkpoint tracing is enabled.

Transaction tracing circuit 300 also includes first and second bus transaction tracing circuits 370, 380 that are coupled to trace control registers 320. First and second bus transaction tracing circuits 370, 380 handshake with bus trace buffers 240, 250, respectively to assist in facilitating storage of data from bus trace buffers 240, 250. First and second bus transaction tracing circuits 370, 380 are also utilized to determine if a traced transaction has been terminated with an error. In addition, first and second bus transaction tracing circuits 370, 380 also determine if transaction "retry" conditions were detected and initiate the appropriate response for that condition.

Transaction tracing circuit 300 also includes an internal transaction tracing circuit 330 that is coupled to trace control registers 320. Internal transaction tracing circuit 330 handshakes with an internal transaction buffers 230 to assist in facilitating storage of data from internal transaction buffers 230. Internal transaction tracing circuit 330 is also utilized to determine if a traced transaction has been terminated with an error.

A checkpoint logic 350 is also included in transaction tracing circuit 300 to calculate address matching for checkpoint tracing whenever a checkpoint tracing function has been enabled. Furthermore, checkpoint logic 350 also determines if enabled checkpoint transactions were terminated with an error and if transaction "retry" conditions were detected.

Transaction tracing circuit 300 utilizes a correlation circuit 340 that, in an advantageous embodiment, is a multiplexer. Correlation circuit 340 prioritizes incoming trace requests from the respective transaction tracing circuits and multiplexes the correct data to an address control circuit 310 and SRAM controller 360.

An address control circuit 310 is also coupled to trace control registers 320 and SRAM controller 360. Address control circuit 310 associates captured bus transaction information with the respective transaction tracing function in trace control registers 320 and routes the appropriate storage address information to SRAM controller 360. SRAM controller 360 receives address information from address control circuit 310 and data from correlation circuit 340. SRAM controller 360 utilizes this information to store the trace data to SRAM 270.

The operation of transaction tracing circuit 300 will be described in greater detail with reference to FIGS. 4A–4H, with continuing reference to FIGS. 2 and 3, that illustrate exemplary state diagrams for a bus interface (analogous to first and second bus interfaces 210, 220 depicted in FIG. 2); a bus trace buffer (analogous to first and second bus trace buffers 240, 250 illustrated in FIG. 2); a bus transaction tracing circuit (analogous to first and second bus transaction tracing circuits 370, 380 depicted in FIG. 3); a correlation circuit (analogous to correlation circuit 340 illustrated in FIG. 3); a checkpoint tracing circuit (analogous to checkpoint tracing circuit 350 depicted in FIG. 3); an internal transaction control (analogous to internal transaction control 280 illustrated in FIG. 2); an internal transaction buffer (analogous to internal transaction buffers 230 depicted in FIG. 2), and an internal transaction tracing circuit (analogous to internal transaction tracing circuit 330 illustrated in FIG. 3).

Figure 4A:
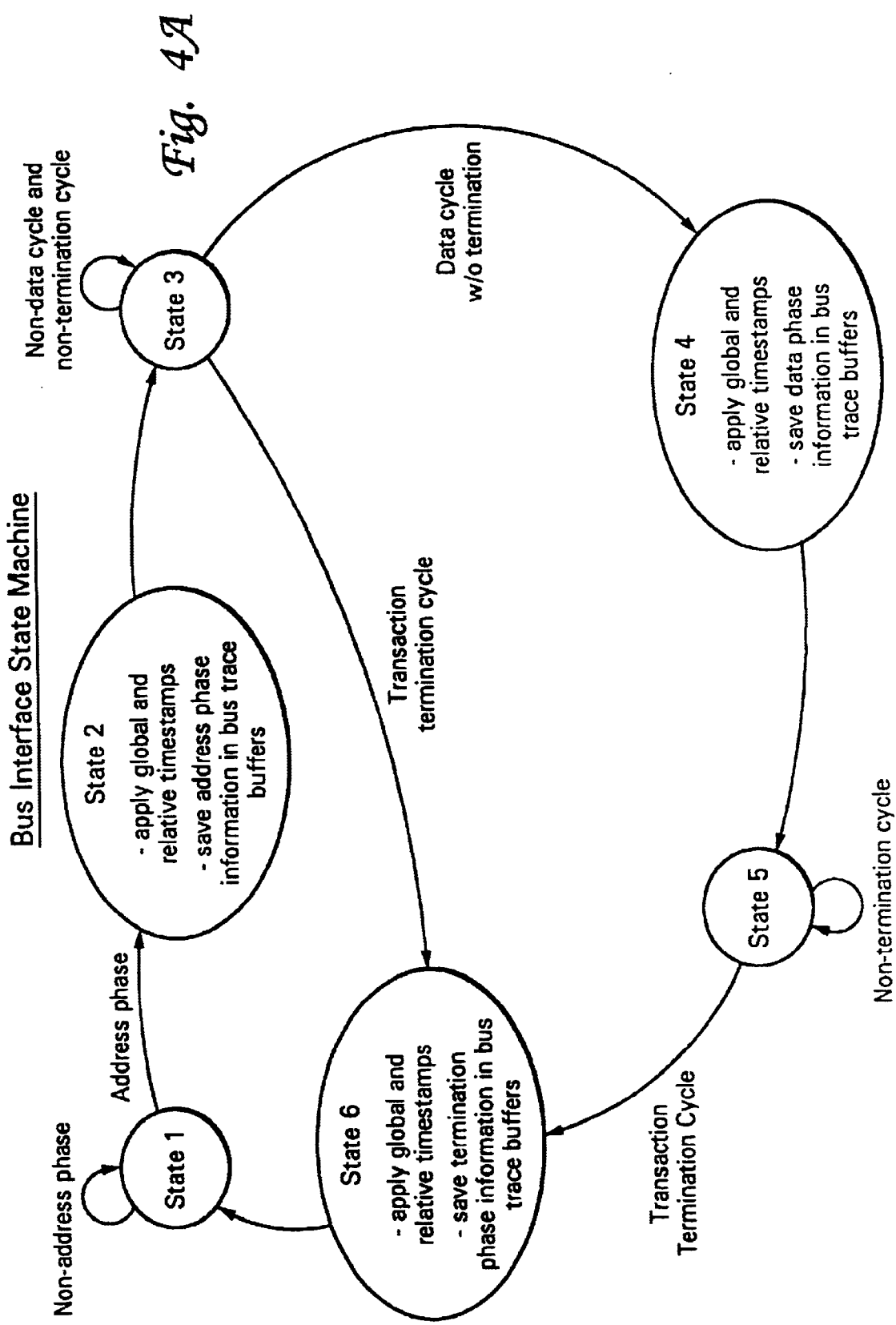
FIG. 4A illustrates an exemplary diagram of a state machine for a bus interface as it relates to transaction tracing.

Turning initially to bus interface state machine diagram 410 depicted in FIG. 4A, first and second bus interfaces 210, 220 are monitored in state 1 for detection of the address phase of a bus transaction; the address phase may require two clock cycles to complete. In the event that a bus transaction's address phase has been detected, either in first or second bus interfaces 210, 220, bus interface state machine transitions to state 2. In state 2, a global timestamp, i.e. a timestamp that is consistent across all trace functions, and a relative timestamp, i.e., a timestamp that is associated with only the bus that is being traced, is applied to the address information and the detected address information is stored in one of bus trace buffers 240, 250. The state machine immediately transitions to state 3 and waits for either a transaction termination cycle or a data cycle that does not terminate the transaction. If a non-terminating data cycle occurs first, the state machine transitions to state 4, where the global and relative timestamps are applied and the data is again saved in one of bus trace buffers 240, 250. From state 4, a transition is made to state 5 where the state machine waits for a transaction termination cycle to occur. Once the transaction termination cycle occurs, the state machine transitions to state 6 and again applies the global and relative timestamps and saves the information to one of bus trace buffers 240, 250. From state 6, the state machine transitions to state 1 and the entire cycle starts over. Turning back to state 3, if in state 3 a transaction termination cycle occurs, the state machine transitions to state 6 and takes the same actions mentioned, above, for state 6.

Referring now to FIG. 4B, bus trace buffer state machine 420 depicts an exemplary operation within first and second bus trace buffers 240, 250. Initially, in state 1, the bus trace buffers are empty and the state machine remains in state 1 until an entry is placed in the buffers. When an entry is placed in the buffers, the state machine transitions to state 2. In state 2, a request is sent to transaction tracing circuit 300, more specifically to first or second bus transaction tracing circuit 370, 380 to request that the current information be stored. The state machine remains in state 2 until an acknowledgment is received from transaction tracing circuit 260, more specifically from either first or second bus transaction tracing circuit 240, 250. Next, a transition is made to state 3 where the current entry point in trace control registers 320 is updated to point to the next SRAM location before transitioning back to state 1.

Figure 4C:
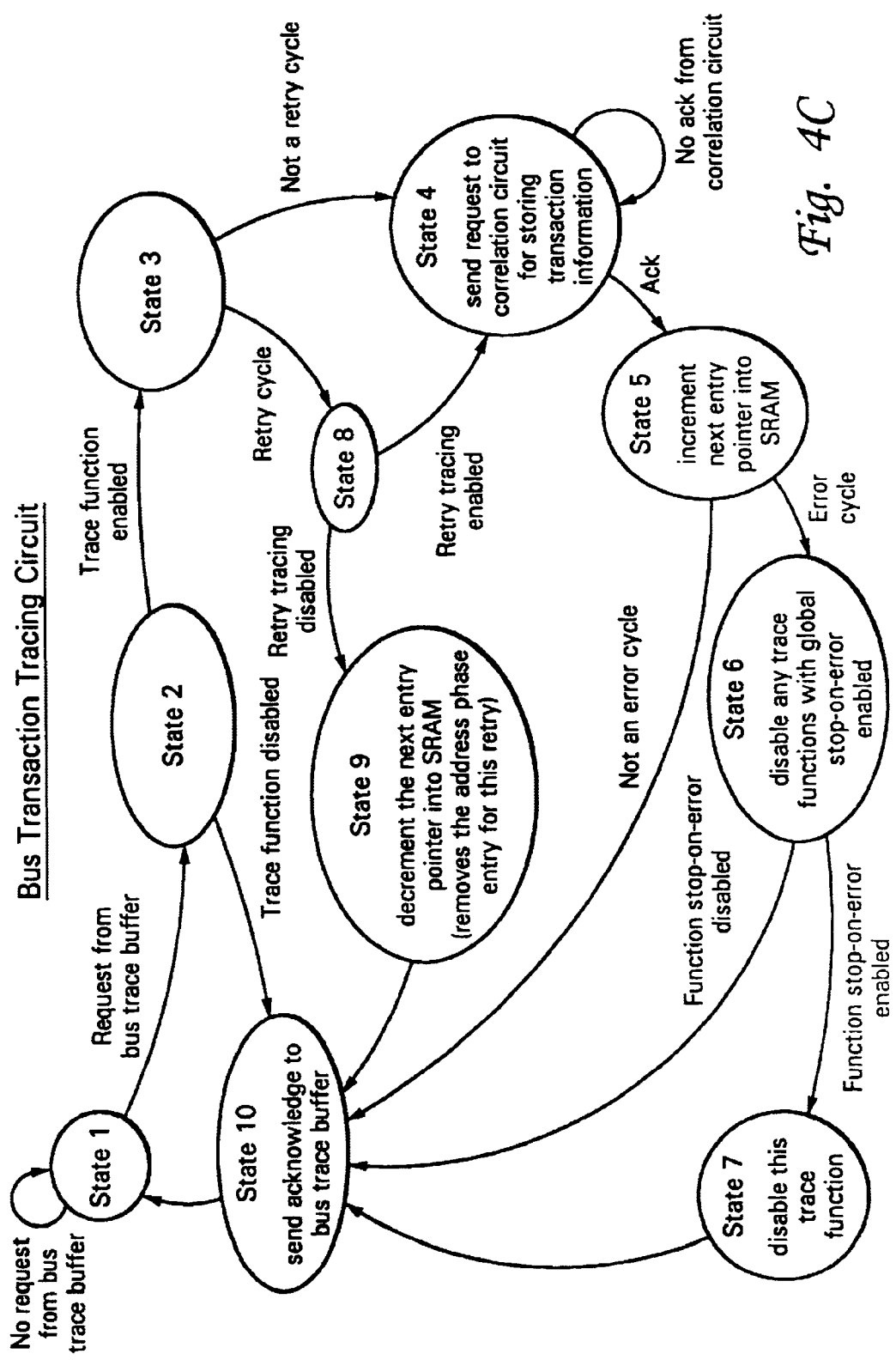
FIG. 4C illustrates an exemplary diagram of a state machine for a bus transaction tracing circuit.

Referring now to FIG. 4C, the transaction tracing circuit state diagram 430 describes an exemplary operation within first or second bus transaction tracing circuits 370, 380. Starting in state 1, the state machine remains in state 1 until it receives a request from either one of first and second bus trace buffers 240, 250. When a request is received, a transition is made to state 2 where a check is made to determine if the current trace function is enabled. If the trace function for this transaction is disabled, then a transition is immediately made to state 10 where an acknowledgment is sent to the bus trace buffer that originated the request before transitioning back to state 1. If, however, in state 2, the trace function is enabled, the state machine transitions to state 3. In state 3, if the current transaction being traced is not a retry cycle, a transition is made to state 4 where a request is sent to correlation circuit 340 to have this transaction stored into SRAM 270. The state machine remains in state 4 until an acknowledgment is received from correlation circuit 340, at which point the state machine transitions to state 5. In state 5, the current entry pointer for this function in trace control registers 320 is updated to point to the next SRAM location. If the transaction that was stored was not an error cycle, then the state machine transitions to state 10. However, if an error cycle is present, then the state machine moves to state 6. In state 6, the state machine checks trace control registers 320 and disables any trace function that has global-stop-on-error enabled. Additionally, in state 6, a check is made to determine if function-stop-on-error is enabled for this trace function. If the function-stop-on-error is not enabled, the process moves to state 10. If, however, this transaction tracing function has its function-stop-on-error enabled, then the state machine transitions to state 7 where this trace function is disabled before transitioning on to state 10. Turning back to state 3, if the-cycle being traced is a retry cycle, then a transition is made to state 8 where a check is made to determine if retry tracing is enabled for this function. If retry tracing is enabled, then a transition is made to state 4 where processing continues as described, above. It should be noted that a retry is not an error condition. Turning back to state 8, if retry tracing is disabled in state 8, a transition is made to state 9. In state 9, the next entry pointer in trace control registers 320 is decremented so the address phase entry for this transaction is effectively removed from SRAM 270. From state 9, a transition is made to state 10.

Figure 4D:
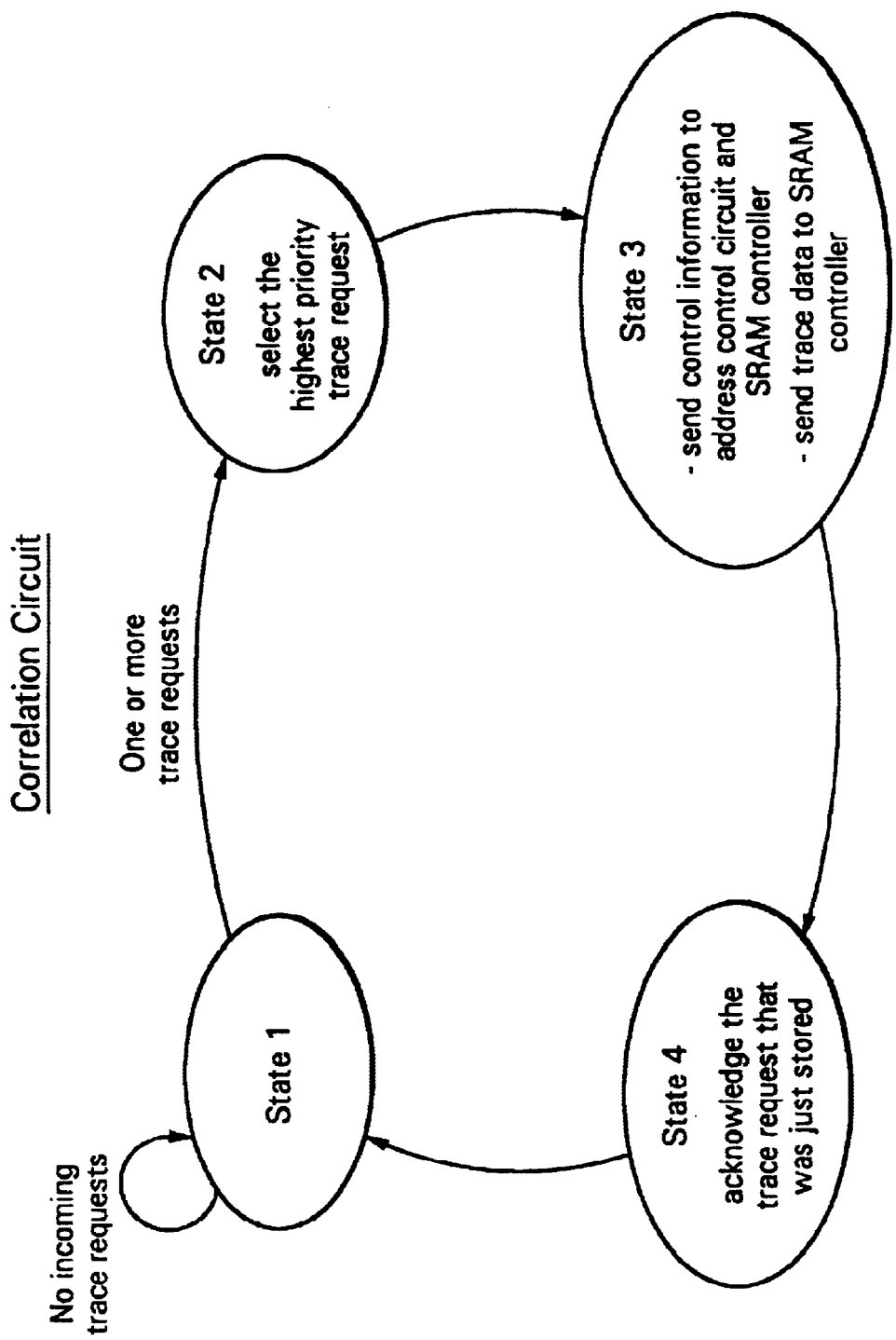
FIG. 4D illustrates an exemplary diagram of a state machine for a correlation circuit.

Referring now to FIG. 4D, the correlation circuit state machine 440 describes an exemplary operation of correlation circuit 340. The state machine starts in state 1 and remains there until one or more trace requests are received from one of the transaction tracing circuits 330, 350, 370 or 380. At that time, a transition is made to state 2 where the requests are prioritized and the highest priority request is selected before transitioning to state 3. In state 3, control information from the trace is sent to address control circuit 310 and SRAM control 360, and the data is sent to SRAM control 360 before transitioning to state 4. Next, in state 4, an acknowledgment is sent to the requester of the selected trace request and then a transition is made back to state 1.

Figure 4E:
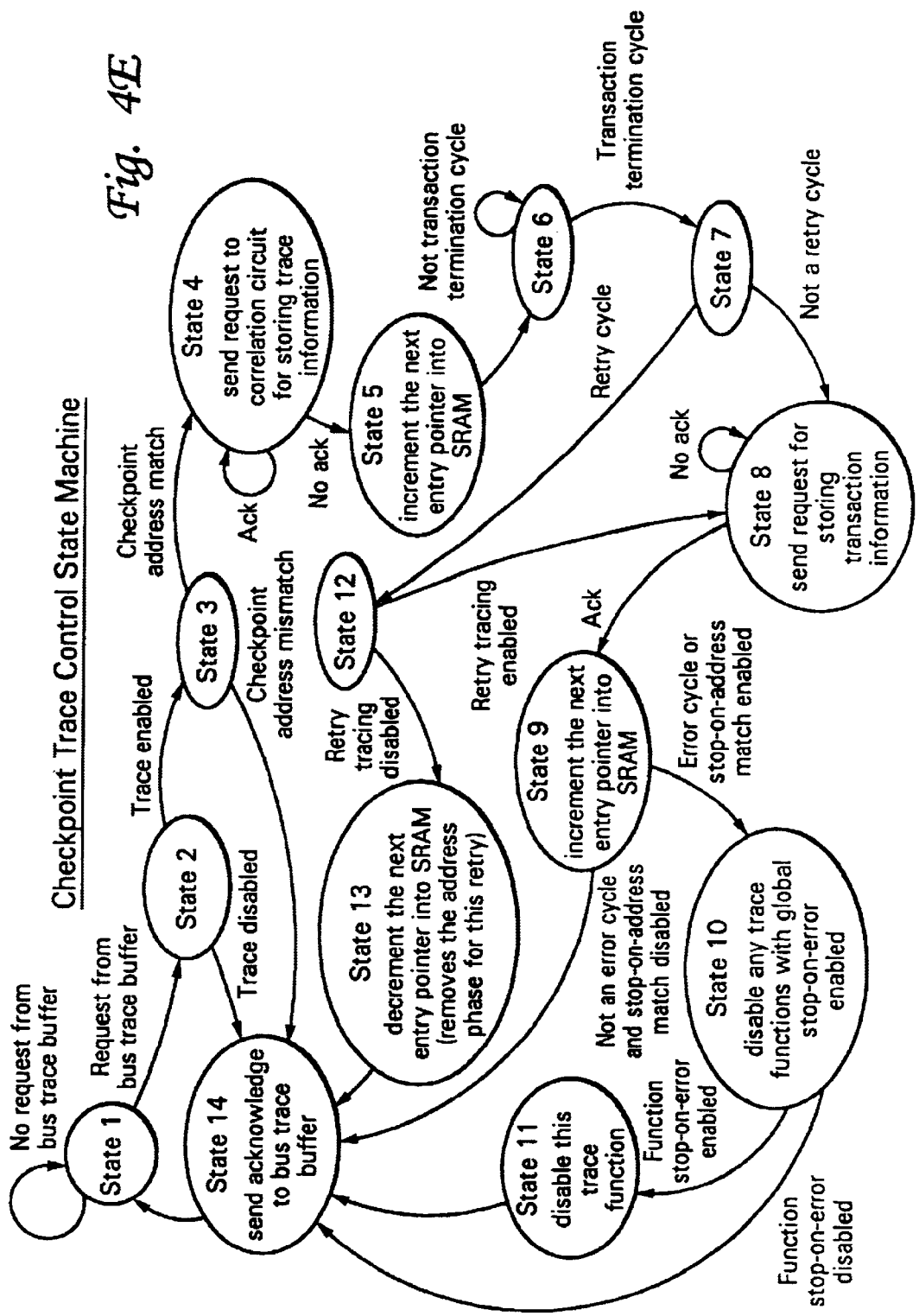
FIG. 4E illustrates an exemplary diagram of a state machine for a checkpoint tracing circuit.

Referring now to FIG. 4E, the checkpoint trace control state machine 450 describes an exemplary operation within checkpoint tracing circuit 350. Initially, at state 1, checkpoint trace control state machine 450 waits for a bus transaction trace request from second bus trace buffer 250. Upon receipt of a bus trace request, the state machine determines at state 2 whether the checkpoint trace function has been enabled. If the checkpoint trace function has been previously enabled, the specified checkpoint address and bus command, e.g. memory address, I/O address or configuration address, are checked against the transaction address and command type at state 3. On the other hand, if the checkpoint trace function is not enabled during state 2, the state machine transitions to state 14 where an acknowledgment is sent to second bus trace buffer 250 before the state machine returns to state 1 and waits for another bus transaction trace request.

Returning back to state 3, if the checkpoint address and bus command do not match the transaction address and bus command, then the state machine transitions to state 14. However, if the checkpoint address and bus command match the requested transaction tracing request, then the state machine transitions to state 4 where a request is generated to correlation circuit 340 for storing the trace information. When an acknowledgment is received from correlation circuit 340, a transition is made to state 5 to increment the next entry pointer into SRAM 270 and then on to state 6. In state 6, the state machine waits for a transaction termination cycle before moving to state 7 where the transaction is evaluated to determine if it is retry cycle. If it is determined at state 7 that a retry cycle was not encountered, the state machine transitions to state 8 where a request is sent to correlation circuit 340 to store the transaction information that has been traced. When an acknowledgment is received from correlation circuit 340 in state 8, a transition is made to state 9 to increment the next entry pointer into SRAM 270. In state 9, checkpoint trace control state-machine 450 checks to see if either an error cycle is present or if the stop-on-address-match feature is enabled in trace control registers 320. If the transaction termination cycle is not an error cycle and stop-on-address-match is disabled, then the state machine transitions to state 14. However, if an error cycle is present or stop-on-address-match is enabled, then the state machine moves to state 10. In state 10, the state machine checks trace control registers 320 and disables any trace function that has global-stop-on-error enabled. Additionally, in state 10, a check is made to determine if function-stop-on-error is enabled for this trace function. If the function-stop-on-error is disabled, the process moves to state 14. If, however, this transaction tracing function has its function-stop-on-error enabled, then the state machine transitions to state 11 where this trace function is disabled before transitioning on to state 14.

Returning back to state 7, if a retry cycle was encountered, the state machine proceeds to state 12 where it is determined if retry tracing has been enabled. If retry tracing has been enabled, the state machine moves to state 8 and proceeds as described above. It-should be noted again that a retry is not an error condition. If, however, at state 12, it is determined that retry tracing has been disabled, the state machine moves to state 13 where it decrements the next entry pointer into SRAM 270 for the checkpoint tracing function to remove the previous trace entry, i.e. address phase for this particular retry, before transitioning to state 14.

Figure 4F:
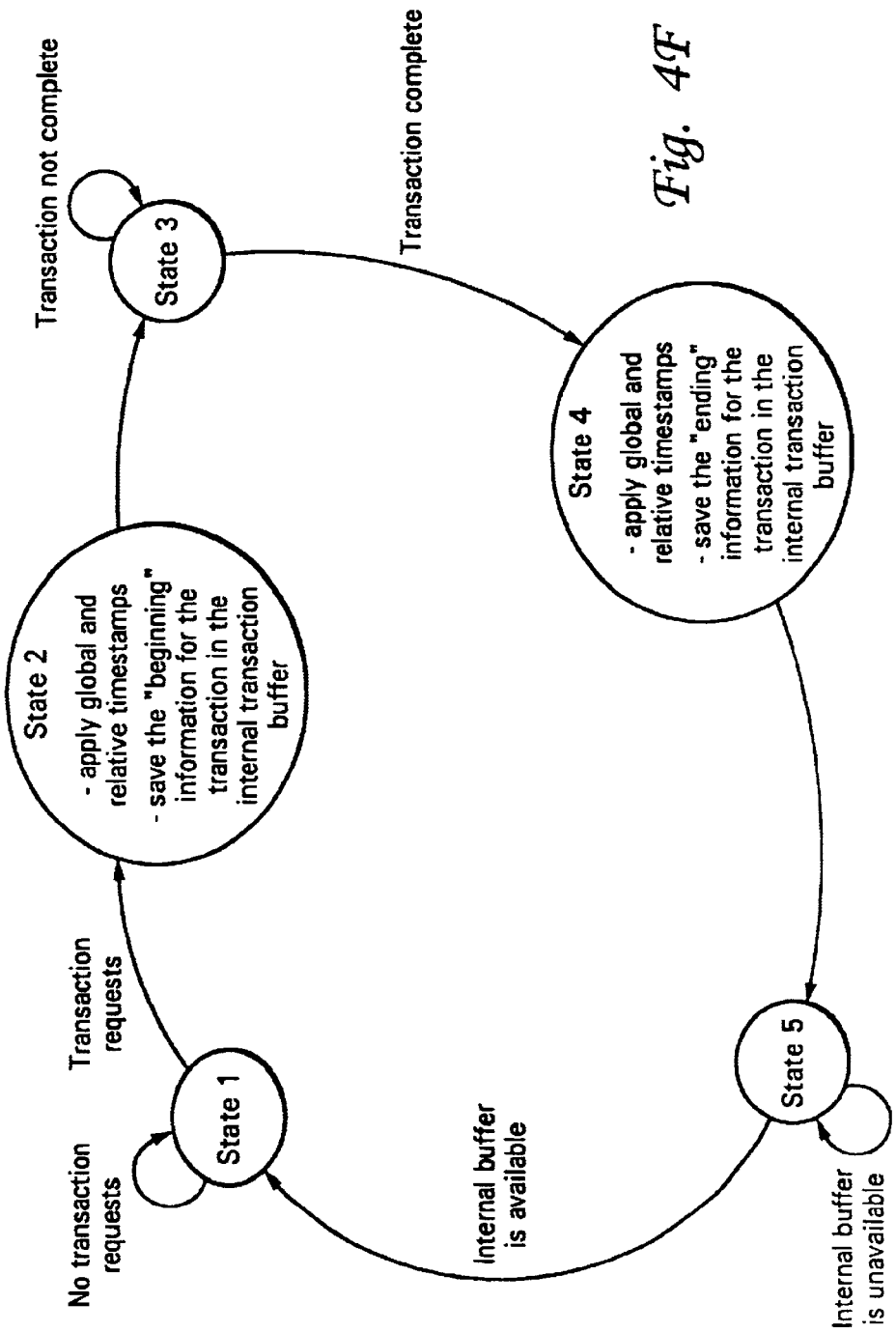
FIG. 4F illustrates an exemplary diagram of a state machine for an internal transaction control.

Referring now to FIG. 4F, the internal transaction control state diagram for tracing 460 describes an exemplary operation within internal transaction control 280. Initially, in state 1, the internal buffer state machine waits for a request from one of first and second bus interfaces 210, 220. In the event that a request for a transaction is received, the process proceeds to state 2 where the global and relative timestamps are applied and the transaction "beginning" information is saved to internal transaction buffers 230 before moving to state 3. In state 3, the process waits for the transaction to complete before moving to state 4. In state 4, the global and relative timestamps are applied and the transaction "completion" information is saved to internal transaction buffers 230. After state 4, a transition is made to state 5 where the state machine waits for transaction trace buffers 230 to make the current working buffer available, or free-up the current buffer, before returning to state 1 to wait for another transaction request.

Figure 4G:
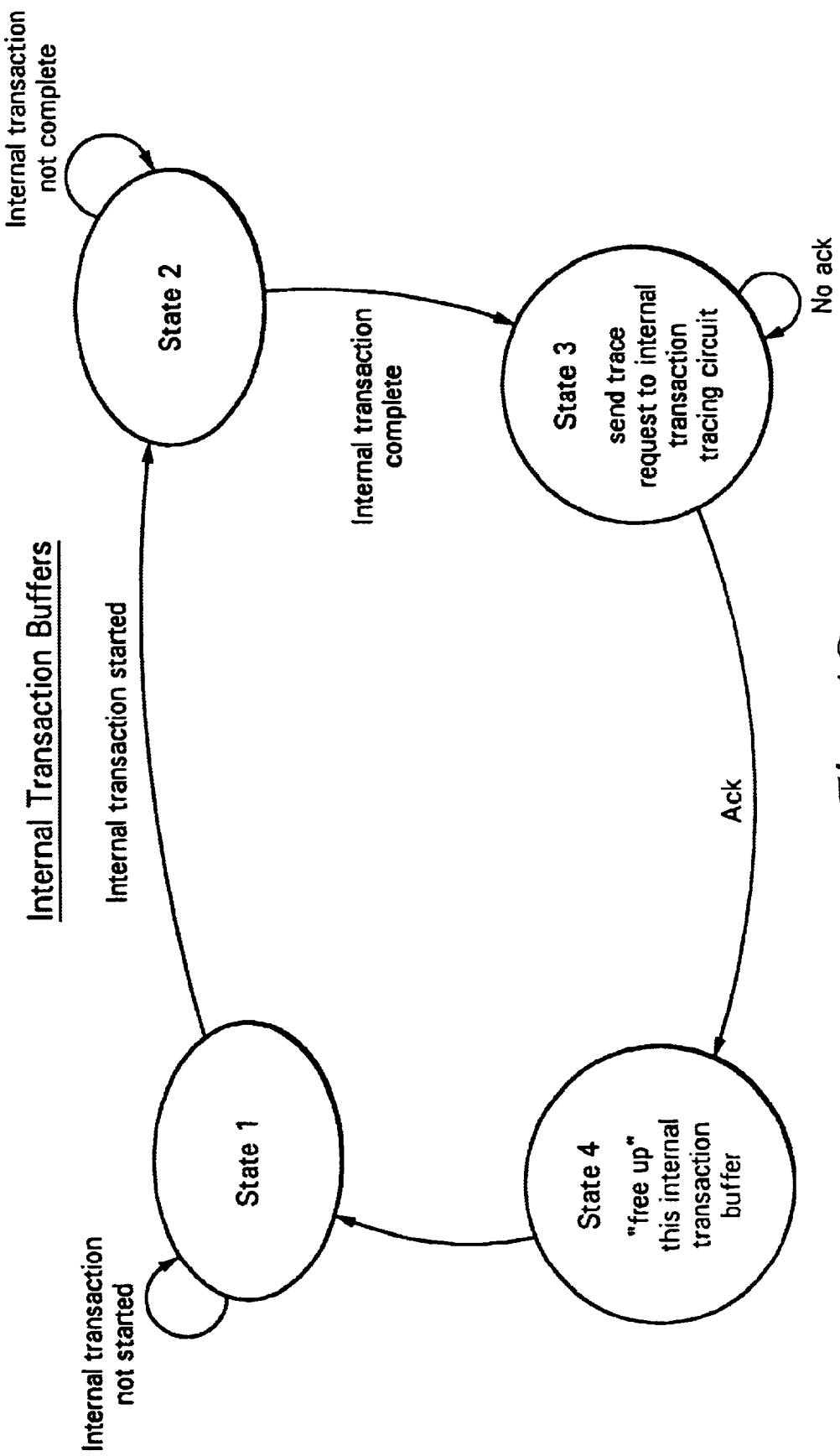
FIG. 4G illustrates an exemplary diagram of a state machine for an internal transaction buffer.

Referring now to FIG. 4G where internal transaction buffers state diagram 470 is depicted. Initially, at state 1, the process waits for transaction "beginning" information to be placed in the buffers. Upon receipt of a transaction beginning, the process transitions to state 2 where the process waits for the transaction "completion" information to be placed in the buffers before transitioning to state 3. In state 3, a request is sent to internal transaction tracing circuit 330 requesting that both the beginning and completion trace information be stored into SRAM 270. The process remains in state 3 until an acknowledgment is received from internal transaction tracing circuit 330 after which the process moves on to state 4. In state 4, the current transaction buffer is made available, i.e., freed-up, before transitioning back to state 1 to start the process again.

Figure 4H:
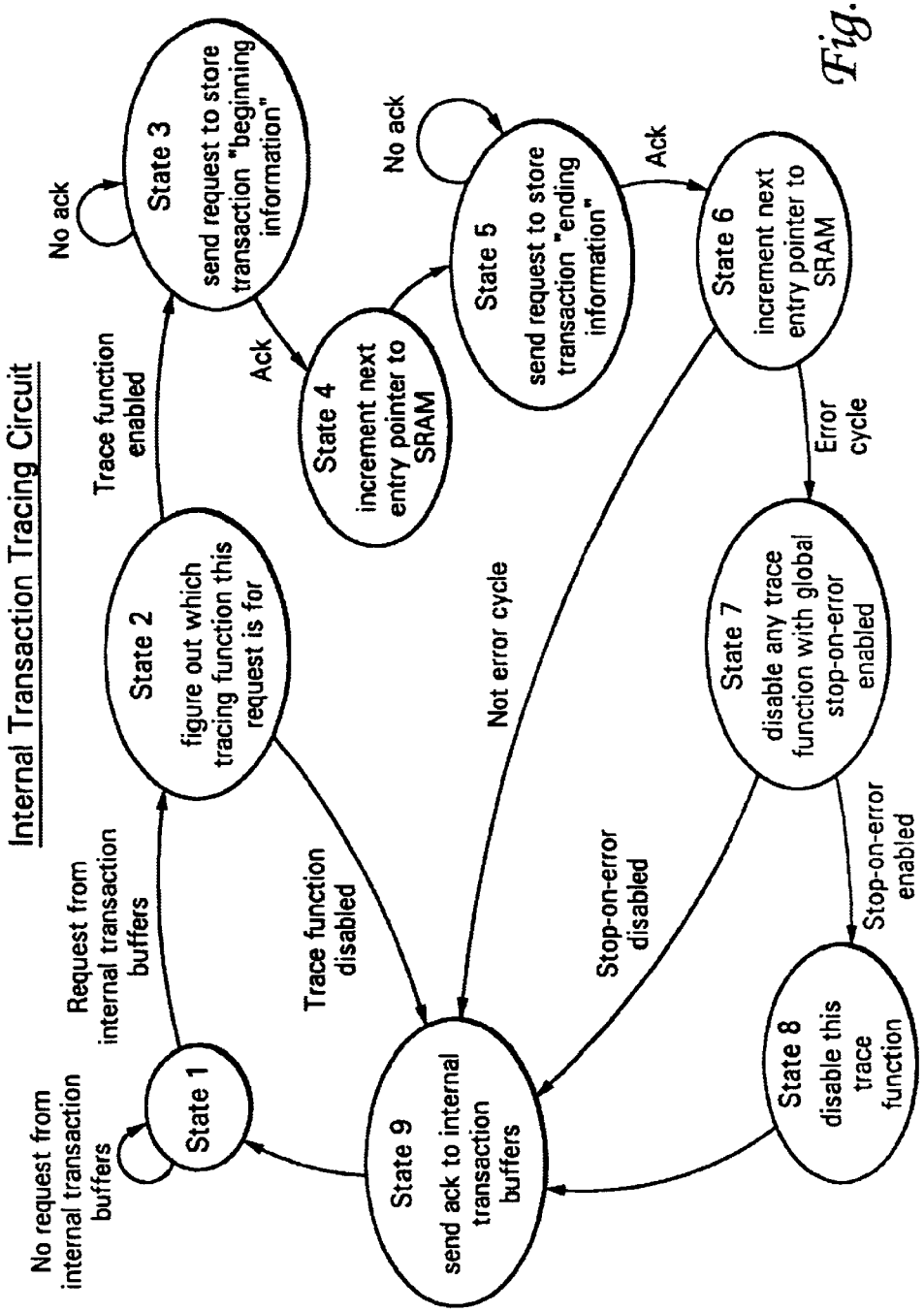
FIG. 4H illustrates an exemplary diagram of a state machine for an internal transaction tracing circuit.

Referring now to FIG. 4H, internal transaction tracing circuit state diagram 480 describes an exemplary operation within internal transaction tracing circuit 330. Initially, in state 1, the process waits for a trace request from internal transaction buffers 230 before moving to state 2. In state 2, the process utilizes control information from the trace to determine which trace function this request is associated with. Next, after determining the specific trace request, the associated tracing function is checked to determine if it is enabled. If the trace function requested is enabled, a move is made to state 3 where a request is sent to correlation circuit 340 to store the transaction beginning data. However, if the trace function requested is disabled, the process proceeds to state 9 where an acknowledgment (ack) signal is transmitted to internal transaction buffers 230 before the process returns to state 1 to await another internal trace request.

Returning back to state 3, upon receiving an acknowledgment from correlation circuit 340, the process transitions to state 4 to increment the next entry pointer into SRAM 270 for the selected trace function and then proceeds to state 5. In state 5, another request is sent to correlation circuit 340 to store the transaction completion information. When acknowledgment is received from correlation circuit 340, the process moves to state 6 to increment the next entry point into SRAM 270. Additionally, in state 6, the trace information is checked to determine if an error occurred during the transaction. In the event that an error cycle was not encountered, i.e., the transaction was completed without error, the process moves to state 9 and proceeds as described above. On the other hand, if an error cycle is detected, then the process transitions to state 7. In state 7, the process checks trace control registers 320 and disables any trace function that has global-stop-on-error enabled. Additionally, in state 7, a check is made to determine if function-stop-on-error is enabled for this trace function. If the function-stop-on-error is disabled, the process moves to state 9. If, however, this transaction tracing function has its function-stop-on-error enabled, then the process transitions to state 8 where this trace function is disabled before moving on to state 9.

While the invention has been particularly shown and described with reference to a preferred embodiment, it will be understood by those skilled in the art that various changes in form and detail may be made therein without departing from the spirit and scope of the invention.

What is claimed is:

1. A bus bridge with embedded transaction tracing capabilities, comprising:
    first and second bus interfaces;
    first and second bus trace buffers, coupled to said first and second bus interfaces, respectively;
    an internal transaction control coupled to said first and second bus interfaces;
    a plurality of internal transaction buffers coupled to said internal transaction control and to first and second bus interfaces; and
    a transaction tracing circuit embedded in said bus bridge, said transaction tracing circuit including:
        at least one set of trace control registers, said trace control registers associated with a transaction tracing function for tracing transactions specified by said trace control registers;
        at least one bus transaction tracing circuit, coupled to said trace control registers and coupled to said first and second bus trace buffers, for applying a relative timestamp and interpreting captured bus transaction information corresponding to a first subset of said transactions specified by said trace control registers, wherein said is a first subset of transactions are bus transactions; and
        an internal transaction tracing circuit, coupled to said trace control registers and coupled to said internal transaction buffers, for interpreting captured internal transaction information corresponding to a second subset of said transactions specified by said trace control registers, wherein said second subset of transactions are internal transactions.

2. The bus bridge as recited in claim 1, wherein said transaction tracing circuit further includes:
    a correlation circuit, coupled to said trace control registers, said bus transaction tracing circuit and said internal transaction tracing circuit, for prioritizing and multiplexing said captured transaction information;
    an address control logic, coupled to said trace control register and said correlation circuit, for associating said captured transaction information with a storage address; and
    a memory controller, coupled to said address control logic and said correlation circuit, for storing said captured transaction information into said storage address of a storage device.

3. The bus bridge as recited in claim 2, wherein said storage device is a static random access memory (SRAM).

4. The bus bridge as recited in claim 2, wherein said correlation circuit is a multiplexer.

5. The bus bridge as recited in claim 1, wherein said transaction tracing circuit further comprises a checkpoint tracing circuit, coupled to said trace control register and said correlation circuit, for determining address and bus cycle matching when said transactions specified by said trace control registers include checkpoint tracing.

6. The bus bridge as recited in claim 5, wherein said bus transaction tracing circuit, said internal transaction tracing circuit and said checkpoint tracing circuit include a function-stop-on-error feature for disabling-a specific trace function when an error condition occurs in a transaction associated with said specific trace function.

7. The bus bridge as recited in claim 5, wherein said bus transaction tracing circuit, said internal transaction tracing circuit and said checkpoint tracing circuit include a global-stop-on-error feature for disabling specific trace functions when an error condition occurs in any trace function.

8. The bus bridge as recited in claim 5, wherein said checkpoint tracing circuit includes a stop-on-address-match feature that functions as an error condition to allow for disabling zero or more trace functions when an address match occurs in a checkpoint trace function.

9. The bus bridge as recited in claim 1, wherein said internal transaction tracing circuit receives said captured internal transaction information from internal trace buffers.

10. The bus bridge as recited in claim 1, wherein said trace control registers includes memory range allocation for said transaction tracing function.

11. The bus bridge as recited in claim 1, wherein said trace control registers includes function-stop-on-error capability for said transaction tracing function.

12. The bus bridge as recited in claim 1, wherein said trace control registers includes global-stop-on-error capability for said transaction tracing function.

13. The bus bridge as recited in claim 1, wherein said trace control register includes a global timestamp generator.

14. The bus bridge as recited in claim 13, wherein each of said first and second bus interfaces and said internal transaction control includes an independent relative timestamp generator for time correlating transactions, said relative timestamp generators having a resolution greater than said global timestamp generator.

15. The bus bridge as recited in claim 1, wherein at least one said transaction specified by said trace control registers is a configuration cycle.

16. The bus bridge as recited in claim 1, wherein said bus bridge is embodied in a monolithic integrated circuit (IC).

17. A bus bridge, comprising:
    first and second bus interfaces;
    an internal transaction control coupled to said first and second bus interfaces;
    at least one internal transaction buffer coupled to said internal transaction control and to first and second bus interfaces; and
    a transaction tracing circuit embedded within said bus bridge, said transaction tracing circuit including:

at least one set of trace control registers, said trace control registers determining tracing function parameters for tracing transaction information;

a bus transaction tracing circuit, coupled to said trace control register, for capturing bus transaction trace information from said bus interfaces responsive to tracing function parameters contained in said trace control registers and storing said bus transaction trace information in a memory; and an internal transaction tracing circuit, coupled to said trace control registers and to said at least one internal transaction buffer, for capturing internal transaction trace information from said at least one internal transaction buffer responsive to tracing function parameters contained in said trace control registers and storing said internal transaction trace information in the memory.

18. The bus bridge of as recited in claim 17, wherein said transaction tracing circuit further comprises:

a correlation circuit, coupled to said trace control registers, said bus transaction tracing circuit and said internal transaction tracing circuit, for prioritizing and multiplexing said captured transaction information;

an address control logic, coupled to said trace control register and said correlation circuit, for associating said captured transaction information with a storage address of said memory; and a memory controller, coupled to said address control logic and said correlation circuit, for storing said captured transaction information into said storage address of said memory.

19. The bus bridge as recited in claim 18, further comprising a checkpoint tracing circuit, coupled to said trace control registers and said correlation circuit, for determining address and bus cycle matching responsive to tracing function parameters contained in said trace control registers.

20. The bus bridge as recited in claim 19, wherein said bus transaction tracing circuit, said internal transaction tracing circuit and said checkpoint tracing circuit include a function-stop-on-error feature for disabling a specific trace function when an error condition occurs in a transaction associated with said specific trace function.

21. The bus bridge as recited in claim 19, wherein said bus transaction tracing circuit, said internal transaction tracing circuit and said checkpoint tracing circuit include a global-stop-on-error feature for disabling specific trace functions when an error condition occurs in any trace function.

22. The bus bridge as recited in claim 19, wherein said checkpoint tracing circuit includes a stop-on-address-match feature that functions as an error condition to allow for disabling zero or more trace functions when an address match occurs in a checkpoint trace function.

23. The bus bridge as recited in claim 18, wherein said correlation circuit is a multiplexer.

24. The bus bridge as recited in claim 17, wherein said memory is a static random access memory (SRAM) embedded in said bus bridge.

25. The bus bridge as recited in claim 17, further comprising:

first and second bus trace buffers, coupled to said first and second bus interfaces, respectively, and coupled to said bus transaction tracing circuit.

26. The bus bridge as recited in claim 17, wherein said trace control registers includes memory range allocation trace data.

27. The bus bridge as recited in claim 17, wherein said trace control registers include function-stop-on-error capability for tracing transaction information.

28. The bus bridge as recited in claim 17, wherein said trace control registers include global-stop-on-error capability for tracing transaction information.

29. The bus bridge as recited in claim 17, wherein said bus bridge further includes a global timestamp generator.

30. The bus bridge as recited in claim 17, wherein said bus bridge is embodied in a monolithic integrated circuit (IC).

* * * * *